US011365466B2

(12) United States Patent
Asai et al.

(10) Patent No.: US 11,365,466 B2
(45) Date of Patent: Jun. 21, 2022

(54) STEEL PLATE FOR HOT FORMING AND MANUFACTURING METHOD OF HOT PRESS FORMED STEEL MEMBER

(71) Applicant: Kobe Steel, Ltd., Kobe (JP)

(72) Inventors: Tatsuya Asai, Kakogawa (JP); Naoki Mizuta, Kakogawa (JP); Hiroyuki Omori, Kakogawa (JP); Takeshi Kojima, Kakogawa (JP)

(73) Assignee: Kobe Steel, Ltd., Kobe (JP)

( * ) Notice: Subject to any disclaimer, the term of this patent is extended or adjusted under 35 U.S.C. 154(b) by 269 days.

(21) Appl. No.: 16/693,558

(22) Filed: Nov. 25, 2019

(65) Prior Publication Data

US 2020/0095660 A1   Mar. 26, 2020

Related U.S. Application Data

(62) Division of application No. 15/107,804, filed as application No. PCT/JP2014/083840 on Dec. 22, 2014, now abandoned.

(30) Foreign Application Priority Data

Dec. 25, 2013  (JP) ................. 2013-267835

(51) Int. Cl.

| C22C 38/14 | (2006.01) |
| C23C 8/10 | (2006.01) |
| C22C 38/06 | (2006.01) |
| C22C 38/04 | (2006.01) |
| C22C 38/02 | (2006.01) |
| C22C 38/00 | (2006.01) |
| C21D 8/02 | (2006.01) |
| B21D 22/02 | (2006.01) |
| C21D 1/18 | (2006.01) |
| C21D 9/46 | (2006.01) |
| C21D 1/673 | (2006.01) |
| C22C 38/38 | (2006.01) |
| B21D 22/20 | (2006.01) |

(52) U.S. Cl.
CPC ............ C22C 38/14 (2013.01); B21D 22/022 (2013.01); C21D 1/18 (2013.01); C21D 1/673 (2013.01); C21D 8/0205 (2013.01); C21D 8/0221 (2013.01); C21D 9/46 (2013.01); C22C 38/001 (2013.01); C22C 38/002 (2013.01); C22C 38/02 (2013.01); C22C 38/04 (2013.01); C22C 38/06 (2013.01); C22C 38/38 (2013.01); C23C 8/10 (2013.01); B21D 22/208 (2013.01); *Y02P 10/20* (2015.11)

(58) Field of Classification Search
None
See application file for complete search history.

(56) References Cited

U.S. PATENT DOCUMENTS

| 2013/0199679 A1 | 8/2013 | Toji et al. |
| 2014/0144560 A1 | 5/2014 | Yamano et al. |
| 2015/0013856 A1 | 1/2015 | Murakami et al. |
| 2015/0027602 A1 | 1/2015 | Murakami et al. |

FOREIGN PATENT DOCUMENTS

| EP | 2 551 359 A1 | 1/2013 |
| JP | 2003-96541 A | 4/2003 |
| JP | 2007-169679 A | 7/2007 |
| JP | 2008-240046 A | 10/2008 |
| JP | 2008-240047 A | 10/2008 |
| JP | 2008-261032 A | 10/2008 |
| JP | 2009-263780 A | 11/2009 |
| JP | 2010-43323 A | 2/2010 |
| JP | 2010-174302 A | 8/2010 |
| JP | 2010-174306 A | 8/2010 |
| JP | 2010-174307 A | 8/2010 |
| JP | 2011-99149 A | 5/2011 |
| JP | 2011-202204 A | 10/2011 |
| JP | 2011-236483 A | 11/2011 |
| JP | 2011236483 A | * 11/2011 |
| JP | 2012-21 9366 A | 11/2012 |
| JP | 2013-174004 A | 9/2013 |
| JP | 2013-185242 A | 9/2013 |
| JP | 2013-185245 A | 9/2013 |
| WO | 2007/129676 A1 | 11/2007 |

OTHER PUBLICATIONS

International Search Report dated Mar. 3, 2015 in PCT/JP14/083840 Filed Dec. 22, 2014.
Extended European Search Report dated May 12, 2017 in Patent Application No. 14873243.1.
English translation of the International Preliminary Report on Patentability and Written Opinion dated Jun. 28, 2016 in PCT/JP2014/083840.
U.S. Appl. No. 15/107,804, filed Jun. 23, 2016, US2016-0319403A1, Tatsuya Asai, et al.

* cited by examiner (Continued)

*Primary Examiner* — Anthony M Liang
(74) *Attorney, Agent, or Firm* — Oblon, McClelland, Maier & Neustadt, L.L.P.

(57) ABSTRACT

Provided is a method for manufacturing a steel member through hot press forming using a steel sheet that contains a comparatively large amount of Si. The steel sheet includes, in mass ratio, C: 0.15% to 0.35%, Si: 1.0% to 3.0%, Mn: 1.0% to 3.0%, Al: more than 0% up to 0.10%, Ti: ([N]×48/14)% to 0.10% (where [N] denotes the amount of N in the steel sheet), B: 5 ppm to 50 ppm, P: more than 0% to less than 0.015%, S: more than 0% up to 0.010%, and N: more than 0% up to 0.010%, the balance being iron and unavoidable impurities. The average oxygen concentration from an outermost surface of the steel sheet down to a depth of 10 μm in a sheet thickness direction is 0.70 mass % or higher.

4 Claims, 6 Drawing Sheets

| 900°C HEATING DWELL TIME(sec) | FORMING STARTING TEMPERATURE (°C) | |
|---|---|---|
| | 750 | 650 |
| 9 | OK | — |
| 12 | OK | OK |
| 22 | OK | NG |
| 32 | NG | NG |
| 42 | NG | NG |

FIG.6B

| 900°C HEATING DWELL TIME(sec) | FORMING STARTING TEMPERATURE (°C) | |
|---|---|---|
| | 750 | 650 |
| 9 | OK | — |
| 12 | OK | OK |
| 22 | OK | OK |
| 32 | OK | OK |
| 42 | OK | NG |

FIG.6C

| 900°C HEATING DWELL TIME(sec) | FORMING STARTING TEMPERATURE (°C) | |
|---|---|---|
| | 750 | 650 |
| 9 | OK | — |
| 12 | OK | OK |
| 22 | OK | OK |
| 32 | OK | OK |
| 42 | OK | OK |

STEEL PLATE FOR HOT FORMING AND MANUFACTURING METHOD OF HOT PRESS FORMED STEEL MEMBER

CROSS-REFERENCE TO RELATED APPLICATIONS

The present application is a divisional application of U.S. patent application Ser. No. 15/107,804 filed Jun. 23, 2016, which is a national stage of International Application No. PCT/JP2014/083840, filed Dec. 22, 2014, which claims priority to Japanese Patent Application No. 2013-267835, filed Dec. 25, 2013. The contents of these applications are incorporated herein by reference in their entirety.

TECHNICAL FIELD

The present invention relates to a steel sheet for hot forming, and to a method for manufacturing a hot press formed steel member using the steel sheet for hot forming.

BACKGROUND ART

For instance, materials that make up steel parts for automobiles are designed to be ever stronger, in order to achieve steel sheets that exhibit both crashworthiness and light weight. To manufacture such steel parts, the steel sheet that is used is required to have high formability. However, when a steel sheet having been imparted with enhanced strength is subjected to cold working, for instance cold press forming, the press forming force increases and dimensional accuracy degrades significantly, which is problematic.

Methods for solving the above problem include hot press forming in which a steel sheet, as a base material, is press-formed in a heated state, and forming and imparting of high strength are realized simultaneously, to achieve a steel member. This method involves forming a steel sheet in a high-temperature state, using a punch and/or a die, and maintaining cooling at a forming bottom dead point, to elicit quenching through removal of heat from the steel sheet to the die, and harden thus the material. A formed product of good dimensional accuracy and high strength can be obtained by resorting to such a forming method. Moreover, it becomes possible to reduce forming force as compared with an instance where a steel member of identical strength class is formed by cold forming.

In the above method, however, a problem arises in that scale that is formed on the steel sheet surface sheds off during hot press forming and adheres to dies, which become thus contaminated; further, the shed scale is pressed against the steel sheet surface, and scratches occur in the surface of the steel member.

As a technology for solving the above problem, for instance, Patent Literature 1 discloses the feature of increasing the content of Si and Al in a steel sheet surface layer section to be higher than that inside the steel sheet, as a result of which there can be suppressed generation of scale upon high-temperature heating during thermal treatment. Patent Literature 1 indicates that it is better to adjust various conditions in a hot rolling step and an annealing step, to form the above steel sheet surface layer section. Patent Literature 2 discloses a feature wherein scale generation during heating is suppressed by setting the Cr content in a steel sheet that undergoes hot working to be higher than 1.0%, and that scale adhesion during hot working is enhanced by reducing the S content in the steel sheet to 0.001% or lower, as a result of which the amount of scale peeling during hot working is significantly reduced.

Patent Literature 3 discloses a steel sheet composition wherein adhesion of generated scale is enhanced by reducing the S content to be 0.001% or lower and incorporating a rare earth element at a content of 0.0002% or higher. Patent Literature 4 discloses a steel sheet composition wherein adhesion of generated scale is enhanced through a reduction in the S content to 0.001% or lower, and growth of scale can be suppressed through incorporation of 0.2% or more of Al, as a result of which the amount of scale peeling during hot working is significantly reduced.

Among alloying elements, Si is effective in terms of increasing strength while securing ductility. Accordingly, steel sheets of increased Si content are used as steel sheets of excellent strength-ductility balance; further, Si is a useful element in the manufacture of a steel member by hot pressing also in terms of reducing hardness variability in the steel member, by eliciting a superior effect of suppressing self-tempering of martensite that occurs during the forming process. However, Patent Literature 1 to Patent Literature 4 above are problematic as regards the hardness stability of the manufactured member, given the low content of Si in the steel sheet.

Patent Literature 5 discloses the feature of distributing recesses, in a density of at least 10 recesses/10000 $\mu m^2$, over the surface of a steel sheet, at an area ratio of 7% or higher. Patent Literature 6 discloses the feature of prescribing the shape of the steel sheet surface to have irregularities that satisfy a relationship $R=L1/L2\times100\geq110\%$ between a surface line length L1, a straight line length L2 and a surface line length ratio R, by cross-sectional observation; the bottom portion of scale penetrates thus into the recesses of the steel sheet surface during hot pressing, whereby the scale becomes closely adhered to the base metal, so that it becomes possible to prevent scale peeling during hot pressing. Patent Literature 5 and Patent Literature 6 further disclose a feature wherein, in order to form the above steel sheet surface, the amount of scarfing by pickling is set to 20 $\mu m$ or less, i.e. a state is brought about of residual presence of recesses on the surface of the pickled surface, without sufficiently performing pickling until homogeneous dissolution of the base metal. Physical adhesion of scale is enhanced as a result. The steel sheets that are used in the examples of Patent Literatures 5 and 6 have low Si content and/or low Mn content. When Mn content is low, however, variability in the hardness of the member after hot pressing is large, which is problematic.

The technologies disclosed in Patent Literatures 1 to 6 involve suppressing scale shedding/peeling through suppression of scale generation during hot pressing. In a real operation, however, the heating temperature, heating time and so forth fluctuate during hot press forming. Accordingly, scale shedding/peeling may occur in some instances depending on the hot press forming conditions. In particular, a problem arises in that shedding/peeling of scale cannot be prevented reliably, by resorting to the above technologies alone, at certain sites where the hot press forming condition need to be controlled rigorously.

CITATION LIST

Patent Literature

[PTL 1] Japanese Unexamined Patent Publication No. 2011-099149
[PTL 2] Japanese Unexamined Patent Publication No. 2010-174302

[PTL 3] Japanese Unexamined Patent Publication No. 2010-174306
[PTL 4] Japanese Unexamined Patent Publication No. 2010-174307
[PTL 5] Japanese Unexamined Patent Publication No. 2008-240046
[PTL 6] Japanese Unexamined Patent Publication No. 2008-240047

SUMMARY OF INVENTION

It is an object of the present invention, arrived at in the light of the above considerations, to provide a method for manufacturing a steel member through hot press forming using a steel sheet having a comparatively high amount of Si, such that the method allows performing hot press forming satisfactorily and allows manufacturing a steel member of superior appearance characteristics, through reliable suppression of scale shedding/peeling during hot press forming, even without restricting hot press forming conditions to a narrow range, and to provide a steel sheet for hot forming that is useful in the above method.

The steel sheet for hot forming of the present invention that attains the above goal includes, in mass ratio,
C: 0.15% to 0.35%;
Si: 1.0% to 3.0%;
Mn: 1.0% to 3.0%;
Al: more than 0% up to 0.10%;
Ti: ([N]×48/14)% to 0.10% (where [N] denotes the amount of N in the steel sheet);
B: 5 ppm to 50 ppm;
P: more than 0% to less than 0.015%;
S: more than 0% up to 0.010%; and
N: more than 0% up to 0.010%,
the balance being iron and unavoidable impurities,
wherein the average oxygen concentration from an outermost surface of the steel sheet down to a depth of 10 μm in a sheet thickness direction is 0.70 mass % or higher.

In a preferred embodiment of the present invention, the average oxygen concentration from the outermost surface of the steel sheet down to a depth of 10 μm in the sheet thickness direction is 0.85 mass % or higher.

Preferably, the steel sheet for hot forming further has as other elements, in mass ratio:
one or more elements selected from the group consisting of:
Cr: more than 0% up to 1.0%;
Mo: more than 0% up to 0.5%; and
one or more from among V, Nb and W: more than 0% up to 0.5%.

The present invention encompasses also a method for manufacturing a hot press formed steel member using the above steel sheet for hot forming. The manufacturing method is a method for manufacturing a hot press formed steel member through heating and hot press forming of the steel sheet for hot forming, wherein the heating is performed at a heating temperature of 1100° C. or lower, a dwell time in an oxidizing atmosphere and at 800° C. or higher is set to 40 seconds or less within a time period from start of heating until completion of hot press forming, and a starting temperature of the hot press forming is set to 600° C. or higher.

The present invention allows reliably suppressing shedding/peeling of scale during the above hot press forming, and allows for good hot press forming, without restricting hot press forming conditions to a narrow range, in hot press forming where there is used a steel sheet of comparatively high Si content. As a result there is obtained a steel member that is free of press-scratches or the like that boasts both beautiful appearance and high strength. Moreover, die contamination is suppressed, which allows curtailing significantly the number of die repairs.

BRIEF DESCRIPTION OF DRAWINGS

FIGS. 1A and 1B illustrate measurements results of Glow Discharge Optical Emission Spectrometry (GDOES) in examples, where FIG. 1A illustrates results for steel sheet No. 2 in Table 2 and FIG. 1B illustrates results for steel sheet No. 1 in Table 2;

FIG. 2A illustrates results for steel sheet No. 2 in Table 2 and FIG. 2B illustrates results for steel sheet No. 1 in Table 2;

FIGS. 5A and 5B are set of photographs of steel member surfaces in examples, where FIG. 5A illustrates a photograph of a steel member of Experiment No. 11B and FIG. 5B illustrates a photograph of a steel member of Experiment No. 11A in Table 3-1; and FIGS. 6A to 6C are set of diagrams illustrating the relationship between hot press forming conditions and scale adhesion in examples, where FIG. 6A illustrates an instance where steel sheet No. 2 is used, FIG. 6B illustrates an instance where steel sheet No. 3 is used, and FIG. 6C illustrates an instance where steel sheet No. 1 is used.

DESCRIPTION OF EMBODIMENTS

In order to solve the above problems, the inventors carried out firstly extensive research focusing on steel sheets for hot press forming. As a result, the inventors conjectured that it suffices to bring about a state in which an oxide is present inside a steel sheet, specifically a state where an oxide is present in a region from the outermost surface of the steel sheet down to a depth of 10 μm in the sheet thickness direction, i.e. a state in which there is an internal oxide layer, specifically, a state in which an oxide is present in at least one from among grain boundaries and the interior of grains, and perfected the present invention on the basis of that conjecture. A steel sheet used in hot press forming is also referred to hereafter as "blank". Hereafter, the region from the outermost surface of a steel sheet down to a depth of 10 μm in the sheet thickness direction is also referred to as "surface layer".

When a steel sheet having the above internal oxide layer is exposed at high temperature in an oxidizing atmosphere, for instance an air atmosphere, the surface layer including the internal oxide layer is transformed entirely into an oxide scale layer. The oxide that makes up the internal oxide layer, specifically internal oxide particles containing elements such as Si and Mn, aggregates at interfaces with the base metal. It is deemed that adhesion between the base metal and the oxide scale is enhanced by the internal oxide particles that aggregate at interfaces with the base metal, as a result of which peeling and detachment of the oxide scale during hot press forming can be suppressed, i.e. high-temperature adhesion of scale can be enhanced.

The average oxygen concentration from the outermost surface of the steel sheet down to a depth of 10 μm in the sheet thickness direction has been used in the present invention as an indicator in order to grasp the extent of the internal oxide. Hereafter, the "average oxygen concentration from the outermost surface of the steel sheet down to a depth of 10 μm in the sheet thickness direction" will be referred to as "surface-layer oxygen concentration". The reason for using the surface-layer oxygen concentration as an indicator is that it has been determined that the oxygen concentration in a region from the outermost surface of the steel sheet down to a depth of 10 μm in the sheet thickness direction contributes to enhancing adhesion of the oxide scale at high temperature, as illustrated in the examples described below.

In the present embodiment, hot press forming was carried out using steel sheets having various surface-layer oxygen concentrations, and the surface characteristics of the obtained steel member were observed visually, as illustrated in the examples described below, to assess a relationship between the surface-layer oxygen concentration of the steel sheets and the surface characteristics of the obtained steel member. As a result, it was found that if the surface-layer oxygen concentration is set to 0.70 mass % or higher, scale shedding/peeling from the steel sheet surface during hot press forming is reliably suppressed, and the obtained steel member exhibits good appearance, even without restricting hot press forming conditions to a narrow range. The surface-layer oxygen concentration is preferably 0.80 mass % or higher, more preferably 0.85 mass % or higher, yet more preferably 0.85 mass % and even yet more preferably 0.90 mass % or higher. A hot-press steel member obtained using a steel sheet that satisfies the above surface-layer oxygen concentration allows removing oxide scale, after hot pressing, in accordance with a method conventionally resorted to, such as shot blasting, and allows performing thereafter welding and/or coating without any problems.

On the other hand, weldability of the steel member is impaired in the case of a steel sheet in which the surface-layer oxygen concentration is excessively high. Such being the case, the upper limit of the surface-layer oxygen concentration is preferably set to about 1.30 mass % or lower. The upper limit of the surface-layer oxygen concentration is more preferably 1.20 mass % or lower, yet more preferably 1.10 mass % or lower.

Even if the surface-layer oxygen concentration is lower than 0.70 mass %, in some instances shedding/peeling of scale is suppressed by restricting, to a limited narrow range, hot press forming conditions that include for instance the heating temperature and the dwell time in an oxidizing atmosphere and at high temperature. As described above, however, the heating temperature, heating time and so forth fluctuate during hot press forming in a real operation, and restricting the conditions to the above narrow range is difficult. Accordingly, shedding/peeling of scale cannot be suppressed reliably in a case where there is used a steel sheet having a surface-layer oxygen concentration lower than 0.70 mass %.

The surface-layer oxygen concentration can be worked out through measurement of an oxygen concentration profile in the depth direction of sheet thickness, by Glow Discharge Optical Emission Spectrometry illustrated in the examples described below.

The chemical composition of the steel sheet is established as described below, in order to perform hot press forming satisfactorily and to secure characteristics such as strength and weldability in the steel member that is obtained through hot press forming. In the chemical compositions described below, "%" denotes "mass %", and "ppm" denotes "mass ppm".

C: 0.15% to 0.35%

The amount of C in the steel sheet is set to 0.15% or higher in order to obtain a high-strength steel member, for instance a steel member having tensile strength of 1180 MPa or higher. The amount of C is preferably 0.17% or higher, more preferably 0.20% or higher. The upper limit of the amount of C is 0.35% or lower, from the viewpoint of the weldability of the steel member. The amount of C is preferably 0.30% or lower, more preferably 0.25% or lower.

Si: 1.0% to 3.0%

Herein Si is an element necessary in order to enhance temper softening resistance and secure high strength. Further, Si has the effect of increasing ductility without incurring a drop in strength, as described above, and is an effective element in terms of reducing variability in the hardness of the member, through suppression of the temper softening of martensite. If the amount of Si is small, the internal oxide layer is not generated sufficiently, and the necessary surface-layer oxygen concentration is not obtained. In order to elicit these effects, the amount of Si is set to be 1.0% or higher. The amount of Si is preferably 1.05% or higher, more preferably 1.10% or higher, and yet more preferably 1.14% or higher. When the amount of Si is excessive, the surface-layer oxygen concentration of the steel sheet becomes likewise excessive, and the weldability of the obtained steel member is impaired. Accordingly, the amount of Si is set to be 3.0% or lower. The amount of Si is preferably 2.5% or lower, more preferably 2.0% or lower.

Mn: 1.0% to 3.0%

Herein, Mn is an element necessary in order to enhance the hardenability of the steel sheet and to obtain a high-strength member. Such being the case, the amount of Mn is set to 1.0% or higher. The amount of Mn is preferably 1.1% or higher, more preferably 1.3% or higher, yet more preferably 1.5% or higher, and even yet more preferably 1.8% or higher. Even if the amount of Mn exceeds 3.0%, however, the effect of Mn levels off while giving rise to an increase in costs. Accordingly, the amount of Mn in the present invention is set to 3.0% or lower. The amount of Mn is preferably 2.8% or lower, more preferably 2.5% or lower.

Al: More than 0% Up to 0.10%

Herein, Al is an element used for the purpose of deoxidation, and the content of Al can be 0.01% or higher. However, increasing the amount of Al translates into a more pronounced effect of raising of the $Ac_3$ point. As a result, it becomes necessary to increase the heating temperature during hot pressing, and oxides form more readily on the steel sheet surface. Production efficiency becomes likewise poorer. Accordingly, the amount of Al is set to be 0.10% or lower, preferably 0.050% or lower.

Ti: ([N]×48/14)% to 0.10% (where [N] Denotes the Amount of N in the Steel Sheet; Likewise Hereafter)

Herein, Ti is an effective element in terms of securing hardenability through fixing of N in the form of TiN, and by mediating the presence of B in a solid solution state. From that point of view the content of Ti is ([N]×48/14)% or higher. The content of Ti is preferably 0.015% or higher, taking into consideration the N level in steel in ordinary steelmaking processes. When the amount of Ti is excessive, on the other hand, the strength of the steel sheet becomes greater than necessary and the life of cutting and punching tools shorter, which translates into higher costs. Accordingly, the amount of Ti is set to be 0.10% or lower. The amount of Ti is preferably 0.07% or lower, more preferably 0.05% or lower.

B: 5 ppm to 50 ppm

Herein, B is an element that enhances the hardenability of the steel material and contributes to increasing the strength of the steel member. To elicit the above effect, B is incorporated in an amount of 5 ppm or higher through incorporation of Ti in the amounts set forth above. The amount of B is preferably 15 ppm or higher, more preferably 20 ppm or higher. When the content of B is excessive, BN is formed in excess and toughness may be impaired. Accordingly, the amount of B is kept at 50 ppm or lower. The amount of B is preferably 40 ppm or lower, more preferably 35 ppm or lower.

The components in the steel material i.e. blank or steel member according to the present invention are as described above, and the balance is iron and unavoidable impurities such as P, S, N, O and the like. As regards P and S among unavoidable impurities, P is preferably reduced to be lower than 0.015%, more preferably to be 0.013% or lower, and yet more preferably 0.010% or lower, in terms of securing for instance weldability. Further, S is preferably reduced to 0.010% or lower, more preferably 0.008% or lower, and yet more preferably 0.005% or lower. When the amount of N is excessive, toughness after hot forming becomes poorer, and weldability and the like may be impaired. Accordingly, the amount of N is preferably kept at 0.010% or lower, more preferably 0.0080% or lower, and yet more preferably 0.0050% or lower. Further, O gives rise to surface flaws, and hence is preferably kept at 0.010% or lower, more preferably at 0.008% or lower.

The elements described below can be further incorporated, as other elements, in amounts such that the effect of the present invention is not impaired.

One or more elements selected from the group consisting of: Cr: more than 0% up to 1.0%; Mo: more than 0% up to 0.5%; and one or more from among V, Nb and W: more than 0% up to 0.5%.

Herein, Cr is an effective element in order to enhance the hardenability of the steel sheet. Further, Cr is an effective element in terms of securing superior oxidation resistance in that scale does not form readily during heating before pressing. The content of Cr is preferably set to 0.1% or higher in order to elicit these effects. More preferably, the content of Cr is set to 0.2% or higher. If the amount of Cr is excessive, however, the effect of Cr levels off while giving rise to an increase in costs. Therefore, the amount of Cr is preferably set to 1.0% or lower. The amount of Cr is more preferably 0.8% or lower, yet more preferably 0.5% or lower.

Herein, Mo is an effective element in order to enhance the hardenability of the steel sheet. The content of Mo is preferably set to 0.05% or higher in order to elicit this effect. More preferably, the content of Mo is set to 0.10% or higher. If the amount of Mo is excessive, however, the effect of Mo levels off while giving rise to an increase in costs. Therefore, the amount of Mo is preferably set to 0.5% or lower. The amount of Mo is more preferably 0.4% or lower, yet more preferably 0.3% or lower.

By being present in the form of carbides in the steel sheet, V, Nb and W elicit the effect of suppressing coarsening of the micro-structure of the steel sheet during heating for hot pressing, and are thus useful in terms of enhancing the toughness of the steel member. The foregoing elements can be incorporated singly or in combinations of two or more elements. The total amount of the foregoing elements is preferably set to 0.01% or higher, in order to sufficiently bring out the above effect. More preferably, the above total amount is 0.03% or higher. If the content of the foregoing elements is excessive, however, the effect of the elements levels off while giving rise to an increase in costs. Accordingly, the total amount of the foregoing elements is preferably 0.5% or lower. More preferably, the above total amount is 0.3% or lower, yet more preferably 0.2% or lower, and even yet more preferably 0.1% or lower.

Method for Manufacturing a Steel Sheet

Means that can be resorted to in order to obtain a steel sheet that satisfies a prescribed surface-layer oxygen concentration by actively causing an oxide to be present at least in one from among grain boundaries and grain interior of the steel sheet surface layer, include (i) taking up the steel sheet at high temperature after hot rolling, and (ii) shortening the pickling time during pickling. Means (i) and (ii) are explained below.

Regarding (i)

Once hot rolling at a finish rolling temperature ranging for instance from 850 to 950° C. is over, the steel sheet is coiled at a coiling temperature of 600° C. or higher. Through such coiling at high temperature a steel sheet is obtained that has an internal oxide layer. More preferably, the coiling temperature is 620° C. or higher, yet more preferably 630° C. or higher, and even yet more preferably 650° C. or higher. On the other hand, the internal oxide layer of the steel sheet is excessively thick when the coiling temperature is excessively high. Manufacturing a steel member by using such a steel sheet results in impaired weldability of the steel member. Accordingly, the upper limit of the coiling temperature is preferably set at about 800° C. or lower.

Regarding (ii)

In the case of a steel sheet containing a large amount of Si, pickling that is performed after coiling involves ordinarily increasing the amount of dissolution, for instance through setting of a longer pickling time, to remove as a result not only the steel sheet surface but also the internal oxide layer, including grain boundary oxide and the like, for instance as disclosed in Japanese Unexamined Patent Publication No. 2012-219366. In the present invention, however, pickling is kept to the minimum necessary, from the viewpoint of actively leaving an internal oxide layer that is formed as a result of the above high-temperature coiling. The present invention differs from conventional instances as regards the feature of shortening thus the pickling time.

Pickling conditions include, for instance, type of acid in the pickling solution: hydrochloric acid, sulfuric acid, nitric acid, or a mixed acid containing nitric acid; acid concentration: 5 to 30 mass %; and temperature of the pickling solution: 50 to 100° C. To set the pickling conditions it is preferable to ascertain beforehand the relationship between the residual amount of the internal oxide layer after pickling and the pickling conditions, specifically the type of acid of the pickling solution, the acid concentration, the temperature of the pickling solution, the pickling time and so forth, in order to grasp the pickling condition range at which the internal oxide layer is not removed.

Conceivable methods for suppressing dissolution/removal of the internal oxide layer include for instance adding, to the pickling solution, an inhibitor, which is a substance that adsorbs onto the steel sheet surface and suppresses excessive pickling. However, this method is ineffective in the case of a steel sheet having an internal oxide layer, as explained next. In ordinary pickling processes, the inhibitor is added to remove only the oxide scale layer of the steel sheet surface, while minimizing dissolution of the base metal as much as possible. In case of using an inhibitor-containing pickling solution to pickle a steel sheet having no internal oxide layer, for instance a steel sheet that is obtained through lowering of the coiling temperature, the inhibitor becomes adsorbed onto the base metal surface upon removal of the oxide scale layer of the steel sheet surface, and dissolution of the base metal is suppressed as a result. When pickling by contrast a steel sheet having an internal oxide layer using a pickling solution having an inhibitor added thereto, the grain boundaries with the base metal are readily eroded by the acid, despite the fact that an inhibitor has been added, due to the presence of oxide particles at the grain boundaries. Thus, the useful internal oxide layer as well is dissolved and removed when the steel sheet is immersed in the pickling solution and left in that state for longer than necessary. A method that involves adding an inhibitor that is ordinarily used to suppress excessive pickling is insufficient as a method for suppressing dissolution and removal of the internal oxide layer. As described above, it is better to set pickling conditions after having grasped beforehand a relationship between the pickling conditions and the residual amount of internal oxide layer after pickling.

The steel sheet of the present invention includes a hot-rolled steel sheet that is obtained through pickling, a cold-rolled steel sheet further obtained through cold rolling, and a steel sheet further obtained through annealing of the cold-rolled steel sheet.

Method for Manufacturing a Steel Member

Shedding/peeling of scale is suppressed by using, for hot press forming, a steel sheet with controlled surface-layer oxygen concentration. However, the conditions during hot press forming need to be controlled as described below in order to reliably suppress shedding/peeling of scale.

Heating Temperature T1: 1100° C. or Lower

Scale forms readily when the heating temperature T1 before hot press forming is excessively high, and scale sheds readily as a result, even when using a prescribed steel sheet. In the present invention, therefore, the heating temperature T1 is set to 1100° C. or lower. Preferably, the heating temperature T1 is 1050° C. or lower, more preferably 1000° C. or lower, yet more preferably 980° C. or lower and even yet more preferably 950° C. or lower. In order to unify the structure into martensite and secure high strength in the steel member, on the other hand, the heating temperature is preferably set to 850° C. or higher, more preferably 880° C. or higher.

The heating atmosphere may be an oxidizing atmosphere, a reducing atmosphere or a non-oxidizing atmosphere. The steel sheet need not be held at above heating temperature, but in the case where the heating atmosphere is an oxidizing atmosphere, the steel sheet may be held within a range so that the "dwell time in an oxidizing atmosphere and at 800° C. or higher" described below is 40 seconds or less. In a case where the atmosphere during heating is a reducing atmosphere or a non-oxidizing atmosphere, the steel sheet may be held within a range of 15 minutes or less, regardless of the above dwell time limitation. The heating rate in which the temperature is heated from room temperature to the above heating temperature is not particularly limited so long as the dwell time is 40 seconds or less in the case where the heating atmosphere is an oxidizing atmosphere, and is not particularly limited in the case where the heating atmosphere is a reducing atmosphere or non-oxidizing atmosphere.

Dwell time in an oxidizing atmosphere and at 800° C. or higher from start of heating until completion of hot press forming: 40 seconds or less It is deemed that when the dwell time in the oxidizing atmosphere at high temperature is excessively long, oxide scale becomes thicker, cracks generate within the scale, and the latter sheds off readily, even if adhesion between the base metal and scale is high. In the present invention, accordingly, the dwell time in an oxidizing atmosphere and at 800° C. or higher has been set to 40 seconds or less within a time period from start of heating until completion of hot press forming in the hot press forming. The dwell time is preferably 35 seconds or less, more preferably, 32 seconds or less, and yet better 30 seconds or less, 25 seconds or less, 22 seconds or less, and particularly preferably 20 seconds or less. The lower limit of the dwell time is set to about 5 seconds, from the viewpoint of aggregation of the internal oxide layer at the interface.

The limitation of the dwell time applies to an instance where the atmosphere is an oxidizing atmosphere, but not to instances where the atmosphere is a non-oxidizing atmosphere or a reducing atmosphere. That is because generation of full-scale oxide scale during heating virtually does not occur in the case of a non-oxidizing atmosphere or a reducing atmosphere. Accordingly, in a case where, for instance, the atmosphere in which the steel sheet is held from the start of heating, until reaching of the above heating temperature and while held at that heating temperature, is a non-oxidizing atmosphere or a reducing atmosphere, after which the steel sheet is exposed to an air atmosphere, then the point in time at which the steel sheet is exposed to the air atmosphere, i.e. the point in time at which the steel sheet is exposed to the oxidizing atmosphere, is taken herein as the starting time of the dwell time.

Starting Temperature of Hot Press Forming: 600° C. or Higher

It is deemed that when the starting temperature of hot press forming is excessively low, i.e. when the temperature of the blank at the timing at which part of the blank comes in contact with a die for the first time is excessively low, the ductility of the scale itself is poor, and scale shedding occurs during forming in this case as well. The starting temperature of the hot press forming may also be referred to thereafter as "forming starting temperature". In the present invention the forming starting temperature is set to 600° C. or higher. The forming starting temperature is preferably 650° C. or higher, more preferably 680° C. or higher. The upper limit of the forming starting temperature can be set, for instance, to 800° C. or lower.

Otherwise, the conditions in hot press forming are not particularly limited. Hot press forming may be performed just once or over a plurality of times. From the viewpoint of press productivity, the bottom dead point during forming may be held for 15 seconds or less, being a range that includes 0 seconds, i.e. no holding of the bottom dead point. Cooling after die release is not particularly restricted, and may involve for instance natural cooling.

The present application claims the right of priority based on Japanese Patent Application No. 2013-267835, filed on Dec. 25, 2013. The entire content of the specification of Japanese Patent Application No. 2013-267835, filed on Dec. 25, 2013 has been incorporated in the present application for reference.

EXAMPLES

The present invention will be explained next more specifically by way of examples, but the invention is not limited by the examples below, and needless to say may be embodied including appropriate modifications, within such scope, that are compatible with the gist in the disclosure heretofore and hereinbelow, all such modifications being encompassed within the technical scope of the invention.

Example 1

In Example 1 steel sheets were evaluated as follows. A steel material having the chemical composition given in Table 1 was melted in a converter, and a slab 230 mm thick was produced through continuous casting. The slab was then hot-rolled. Hot rolling involved heating of the slab up to 1250° C. in a heating furnace followed by rough rolling and finish rolling, to bring the thickness of the slab to 2.3 mm. Thereafter, the slab was cooled down to the coiling temperature illustrated in Table 2, and was coiled in the form of a coil. The coil was subjected thereafter to pickling. In all instances the pickling solution that was used was hydrochloric acid at a concentration of 10 mass % and solution temperature of 83° C., as illustrated in Table 2.

As a preliminary experiment in the pickling process, firstly 50 mm$^2$ test pieces were cut out from the steel sheet after hot rolling. In the laboratory, the test pieces were treated with a pickling solution in the form of hydrochloric acid at a concentration of 10 mass % and a solution temperature of 83° C., while modifying the pickling time for the respective test pieces, to work out thereby a relationship between pickling time and extent of residual presence of the internal oxide layer. The extent of residual presence of the internal oxide layer was checked on the basis of the mass before pickling and after pickling, and on the basis of cross-sectional observations. The results revealed that oxide scale alone is removed at a pickling time of 30 seconds, whereas not only the oxide scale but also the internal oxide layer itself is completely removed at a pickling time of 86 seconds. In the light of the above observations, the pickling time was changed as given in Table 2 to modify thereby the extent of residual presence of the internal oxide layer accompanying removal of the oxide scale generated on the steel sheet surface.

After pickling, each steel sheet was cold-rolled, as it was, to a thickness of 1.4 mm, to yield a respective cold-rolled steel sheet.

Using the cold-rolled steel sheets, the surface-layer oxygen concentration was measured and a hot forming test for evaluation of hot scale adhesion was performed in the following manner.

Measurement of Surface-Layer Oxygen Concentration

The surface-layer oxygen concentration, i.e. the "average oxygen concentration from the outermost surface of the steel sheet down to a depth of 10 µm in the sheet thickness direction" was measured by Glow Discharge Optical Emission Spectrometry. The analysis was performed using the instrument GDA 750 by SPECTRUMA ANALYTIK GmbH. The measurement conditions included a measurement target in the form of a region having a diameter of 4 mm within the steel sheet surface, power of 50 W, argon gas at a pressure of 2.5 hectopascals, and the use of a glow discharge source (dry GDS, dry glow discharge spectrometry) model Spectruma Analytik-Grimm, with the measurement pulse set to 50%.

In more detailed terms, the surface-layer oxygen concentration was calculated by working out a concentration profile of oxygen in the depth direction of a test piece having been cut out from the width central portion of each cold-rolled steel sheet, integrating the oxygen concentration in a region from the outermost surface, i.e. from a depth of 0 µm, to a 10 µm depth, and dividing the integral value by 10 µm. This measurement was performed at one site of the respective test pieces having been prepared out of the steel sheet numbers given in Table 2. The results are given in Table 2.

TABLE 1

| Chemical composition* (mass %) | | | | | | | | | | | |
| --- | --- | --- | --- | --- | --- | --- | --- | --- | --- | --- | --- |
| C | Si | Mn | Cr | N | Ti | B | P | S | Al | O | [N] × 48/14 |
| 0.22 | 1.14 | 2.22 | — | 0.0041 | 0.029 | 0.0025 | 0.011 | 0.001 | 0.006 | 0.046 | 0.014 |

*Balance: iron and unavoidable impurities other than P, S, N and O.

TABLE 2

| Steel sheet No. | Coiling temperature (° C.) | Pickling time (sec) | Solution temperature (° C.) | Hydrochloric acid concentration (mass %) | Surface-layer oxygen concentration (mass %) |
| --- | --- | --- | --- | --- | --- |
| 1 | 650 | 30 | 83 | 10 | 0.95 |
| 2 | 650 | 86 | 83 | 10 | 0.63 |
| 3 | 650 | 40 | 83 | 10 | 0.85 |

Table 2 reveals the following. The pickling time of steel sheet No. 2 in Table 2 was excessively long, and accordingly the surface-layer oxygen concentration was low. In steel sheet No. 1, by contrast, the steel sheet was coiled at high temperature after hot rolling and the pickling time was short; hence a steel sheet of sufficiently high surface-layer oxygen concentration was obtained as a result. In steel sheet No. 3 the pickling time was slightly longer than in steel sheet No. 1, and therefore the surface-layer oxygen concentration was slightly lower than that of steel sheet No. 1, within the prescribed range of the present invention.

Figure 1A:
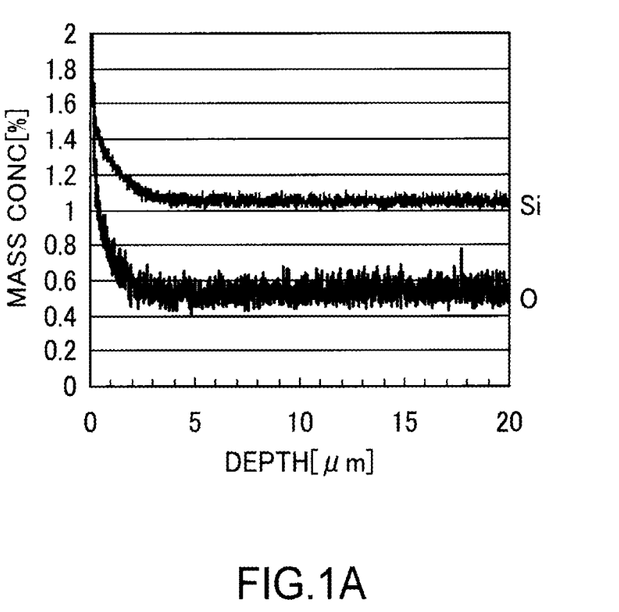
Figure 1B:
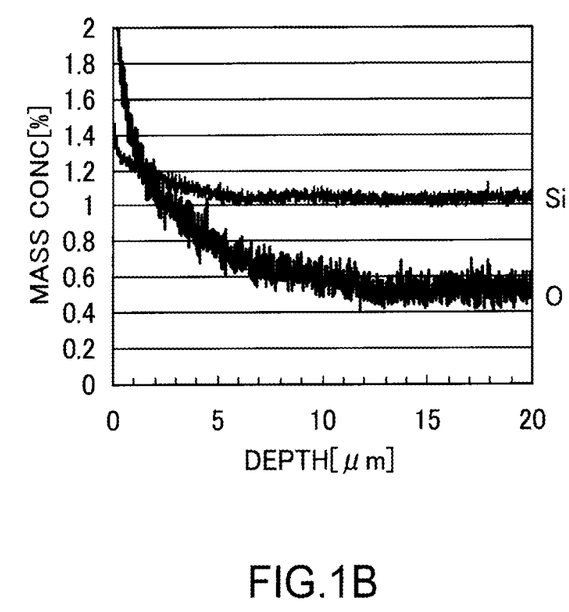
Figure 2A:
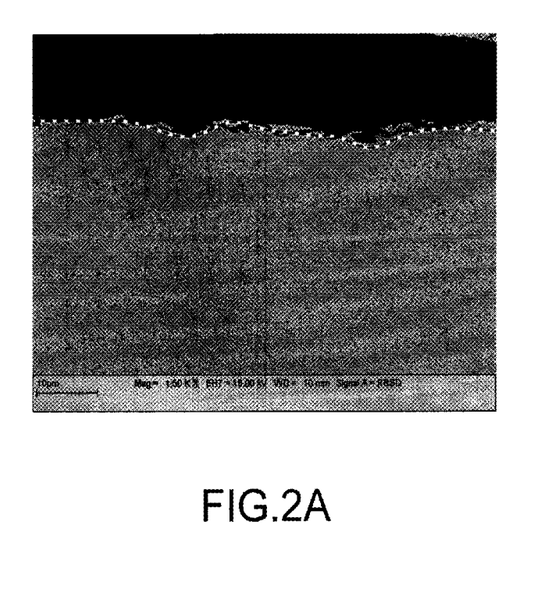
FIGS. 2A and 2B are set of SEM (Scanning Electron Microscope) micrographs of cross-sections in the sheet thickness direction, including a surface layer, of a steel sheet, where
Figure 2B:
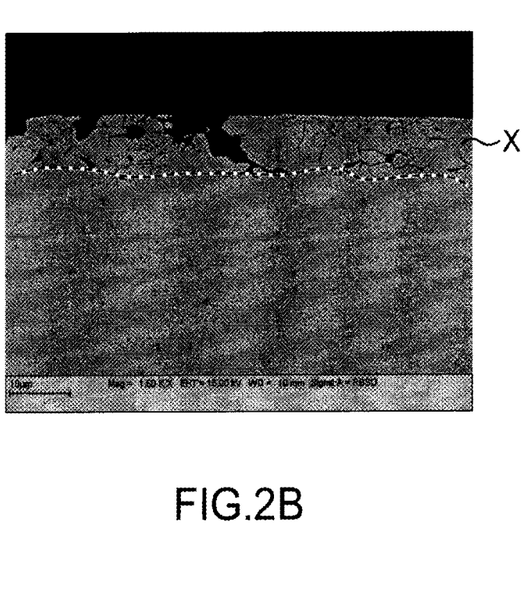

FIG. 1A and FIG. 1B depict the GDOES measurement of steel sheets No. 2 and No. 1 in Table 2, respectively. FIG. 2A and FIG. 2B illustrate, respectively, SEM micrographs of a cross-section, in the sheet thickness direction, of the steel sheets of steel sheets No. 2 and No. 1 of Table 2, including the surface layers. The symbol X in FIG. 2 denotes the cross-sectional observation result of the internal oxide layer. The graphs in FIGS. 1A and 1B illustrate also a Si concentration profile, for reference, in addition to the concentration profile of oxygen.

A comparison between the GDOES measurement results of steel sheet No. 2, being an example in which the surface-layer oxygen concentration was insufficient and virtually no internal oxide layer was formed, and steel sheet No. 1 being an example in which the surface-layer oxygen concentration was equal to or higher than a given concentration and there was an internal oxide layer, reveals that in steel sheet No. 2 illustrated in FIG. 1A the oxygen concentration decreases sharply from the outermost surface of the steel sheet to a depth of about 2 to 3 µm, and is substantially identical to the oxygen concentration inside the steel sheet, i.e. virtually no internal oxygen layer is formed. This can be grasped in FIG. 2A from the fact that virtually no internal oxide is generated at a region above the dotted line. In steel sheet No. 1 illustrated in FIG. 1B, by contrast, it is found that the oxygen concentration profile from the outermost surface of the steel sheet down to a depth of 10 µm exhibits a gentle curve, and oxygen is sufficiently present from the outermost surface of the steel sheet down to a depth of 10 µm, i.e. an internal oxide layer is formed. This can be grasped in FIG. 2B from the fact that an internal oxide layer is present in a region from the outermost surface of the steel sheet down to a depth of about 10 µm, i.e. in a region above the dotted line.

Example 2

In Example 2 there was evaluated a method for manufacturing a steel member. In more detailed terms, a hot forming test was carried out as described below to evaluate hot oxide scale adhesion.

Hot Forming Test

Figure 3:
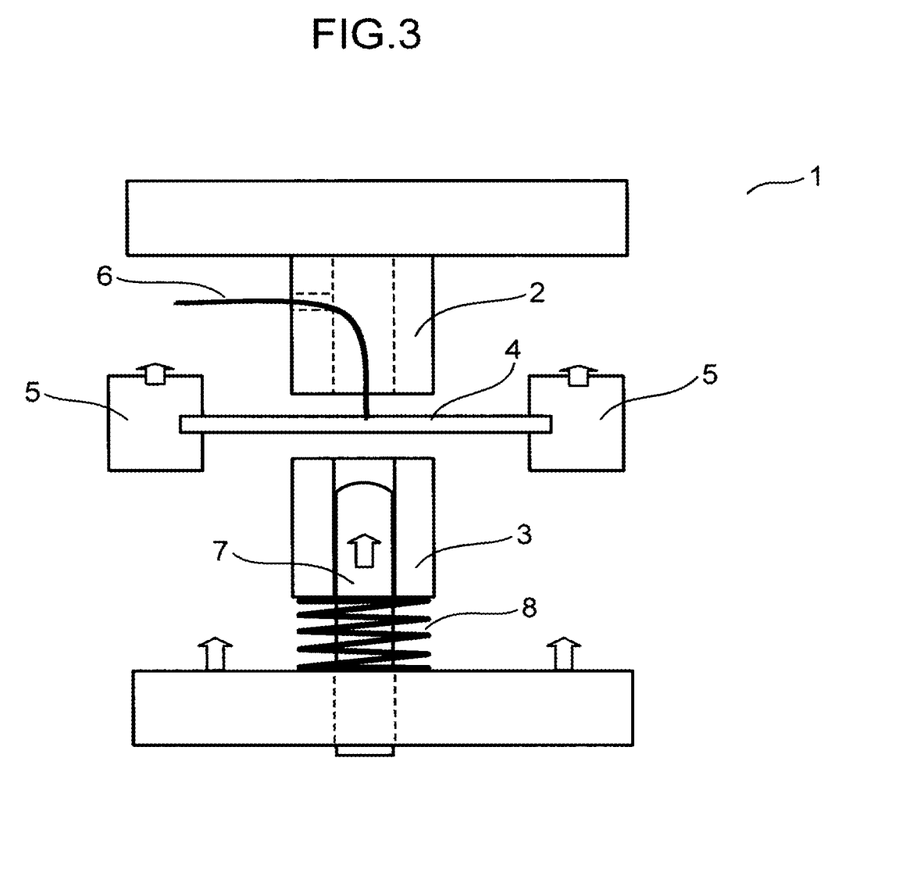
FIG. 3 is a schematic side-view diagram of a hot working reproduction test device used in a hot forming test in examples.

The above cold-rolled steel sheets were cut to a size 1.4 mm (t)×150 mm (w)×50 mm (L), and were degreased, to yield respective test pieces. A hot forming test was performed using the test pieces. The test device used in the test was a hot-working reproduction test device "Thermomaster Z" with electric heater, by Fuji Electronic Industrial Co., Ltd. As illustrated in FIG. 3, tools for stretch-expand forming which consist of a fixed upper die 2 and a lower die 3 having a presser spring 8 and a test piece 4 were installed inside the test device 1, and electrical conducting heating was performed using electrodes 5. Thereafter, the lower die 3 was firstly raised, to sandwich the test piece 4 between the lower die 3 and the fixed upper die 2, and hot forming was subsequently performed by moving the stretch expand forming punch 7 upward. The temperature of the steel sheet, as the test piece, could be learned using a thermocouple 6. The hot forming conditions were as follows.

Figure 4:
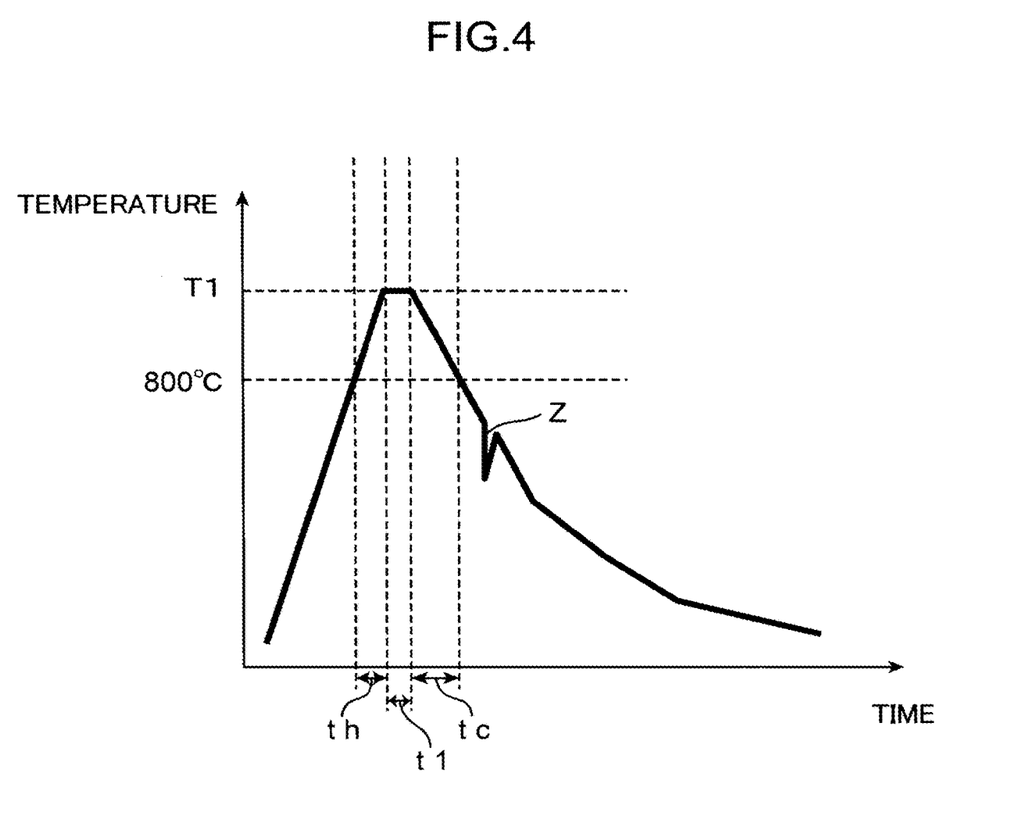
FIG. 4 is a diagram illustrating a heating-cooling pattern in a hot forming test in examples.

Hot Forming Conditions
 Heating atmosphere: air atmosphere
 Forming height: 8 mm
 Forming rate: 13 mm/s
 Holding time of forming bottom dead point: 0.1 s
 Overhang punch diameter: 20 mm
 Tip R of overhang punch: 10 mm FIG. 4 illustrates a heating cooling pattern realized in the present example. In FIG. 4, the symbol Z denotes the time of hot press forming. As FIG. 4 illustrates, the average heating rate in which the temperature is heated from room temperature, being the heating starting temperature, up to the heating temperature, i.e. T1: 900° C., being the "highest reached temperature" in the present example, was set to average heating rate: 25° C./s. Once the highest reached temperature T1 was attained, heating was discontinued immediately, i.e. the holding time t1 was set to t1=0 second at the highest reached temperature, and natural cooling was initiated. FIG. 4 illustrates a state t1>0 in order to explain the holding time t1 at the highest reached temperature. Hot press forming was started at the point in time at which the temperature of the steel sheet reached the forming starting temperature given in Table 3-1 or Table 3-2. During forming, the bottom dead point was held for 0.1 seconds, after which the die was retracted and natural cooling was then allowed to proceed down to room temperature.

In the present example, the atmosphere from start of heating until completion of hot press forming was an oxidizing atmosphere. Accordingly, the "dwell time in an oxidizing atmosphere and at 800° C. or higher" was worked out as a sum total $(t_h+t1+t_C)$ of a time $t_h$ required for the temperature to reach the highest reached temperature T1 from 800° C., in a temperature rise process, a holding time t1 at the highest reached temperature, and a time $t_C$ required to reach 800° C. from the highest reached temperature T1, in a cooling process, as illustrated in the heating cooling pattern of FIG. 4.

Evaluation of Scale Adhesion

The surface of each steel member obtained in the hot press forming, i.e. the steel member in a state of having been cooled down to normal temperature, by natural cooling, from a state brought about through die retraction after hot press forming, was observed visually, to assess the presence or absence of scale peeling. Instances where no scale peeling was observed were rated as OK, indicative of good scale adhesion, while instances where scale peeling was observed were rated as NG, indicative of poor scale adhesion. The results are given in Table 3-1 and Table 3-2.

Figure 5A:
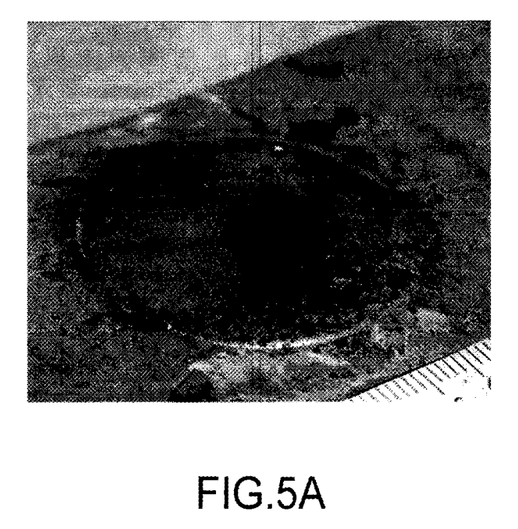
Figure 5B:
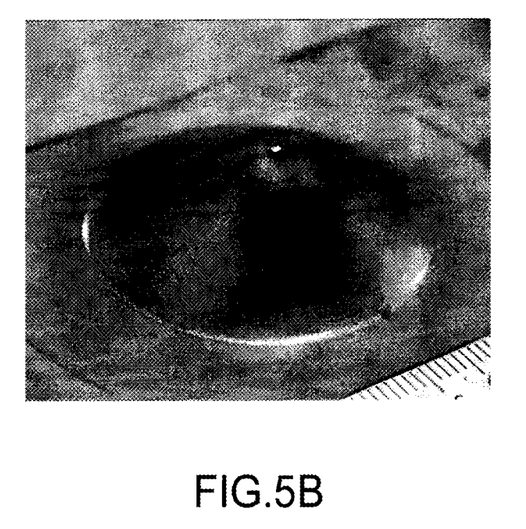

FIGS. 5A and 5B illustrate photographs of examples of the surface of the steel members. FIG. 5A is a photograph of a steel member obtained in an example where the steel sheet of Experiment No. 11B in Table 3-1, i.e. steel sheet No. 2, was utilized. FIG. 5A shows peeling of the surface of the steel member. FIG. 5B is a photograph of a steel member obtained in an example where the steel sheet of Experiment No. 11A in Table 3-1, i.e. steel sheet No. 1, was utilized. FIG. 5B depicts an obtained steel member of good appearance, without peeling at the surface of the steel member. Other examples in Table 3-1 and the examples in Table 3-2 were evaluated through observation of the surface as in FIGS. 5A and 5B.

TABLE 3-1

| Experiment No. | Steel sheet No. | Highest reached temperature (T1) (° C.) | Average heating rate in temperature region of 800° C. or higher (° C./s) | Time ($t_h$) from 800° C. to T1 in temperature rise process (s) | Holding time (t1) at T1 (s) | Time ($t_c$) from T1 to 800° C. in cooling process (s) | Dwell time* ($t_h$) + (t1) + ($t_c$) (s) | Cooling after temperature holding | Forming starting temperature (° C.) | Scale adhesion |
|---|---|---|---|---|---|---|---|---|---|---|
| 1A | 1 | 900 | 100 | 1 | 0 | 8 | 9 | Natural cooling | 750 | OK |
| 1B | 2 | | | | | | | | | OK |
| 2A | 1 | 900 | 25 | 4 | 0 | 8 | 12 | Natural cooling | 750 | OK |
| 2B | 2 | | | | | | | | | OK |
| 3A | 1 | 900 | 25 | 4 | 0 | 8 | 12 | Natural cooling | 650 | OK |
| 3B | 2 | | | | | | | | | OK |

TABLE 3-1-continued

| Experiment No. | Steel sheet No. | Highest reached temperature (T1) (° C.) | Average heating rate in temperature region of 800° C. or higher (° C./s) | Time ($t_h$) from 800° C. to T1 in temperature rise process (s) | Holding time (t1) at T1 (s) | Time ($t_c$) from T1 to 800° C. in cooling process (s) | Dwell time* ($t_h$) + (t1) + ($t_c$) (s) | Cooling after temperature holding | Forming starting temperature (° C.) | Scale adhesion |
|---|---|---|---|---|---|---|---|---|---|---|
| 4A | 1 | 900 | 25 | 4 | 0 | 8 | 12 | Natural cooling | 550 | NG |
| 5A | 1 | 900 | 25 | 4 | 10 | 8 | 22 | Natural cooling | 750 | OK |
| 5B | 2 | | | | | | | | | OK |
| 6A | 1 | 900 | 25 | 4 | 10 | 8 | 22 | Natural cooling | 650 | OK |
| 6B | 2 | | | | | | | | | NG |
| 7A | 1 | 900 | 25 | 4 | 10 | 8 | 22 | Natural cooling | 550 | NG |
| 8A | 1 | 900 | 25 | 4 | 20 | 8 | 32 | Natural cooling | 750 | OK |
| 8B | 2 | | | | | | | | | NG |
| 9A | 1 | 900 | 25 | 4 | 20 | 8 | 32 | Natural cooling | 650 | OK |
| 9B | 2 | | | | | | | | | NG |
| 10A | 1 | 900 | 25 | 4 | 20 | 8 | 32 | Natural cooling | 550 | NG |
| 11A | 1 | 900 | 25 | 4 | 30 | 8 | 42 | Natural cooling | 750 | OK |
| 11B | 2 | | | | | | | | | NG |
| 12A | 1 | 900 | 25 | 4 | 30 | 8 | 42 | Natural cooling | 650 | OK |
| 12B | 2 | | | | | | | | | NG |

*Dwell time in oxidizing atmosphere and at 800° C. or higher

TABLE 3-2

| Experiment No. | Steel sheet No. | Highest reached temperature (T1) (° C.) | Average heating rate in temperature region of 800° C. or higher (° C./s) | Time ($t_h$) from 800° C. to T1 in temperature rise process (s) | Holding time (t1) at T1 (s) | Time ($t_c$) from T1 to 800° C. in cooling process (s) | Dwell time* ($t_h$) + (t1) + ($t_c$) (s) | Cooling after temperature holding | Forming starting temperature (° C.) | Scale adhesion |
|---|---|---|---|---|---|---|---|---|---|---|
| 13A | 1 | 900 | 25 | 4 | 30 | 8 | 42 | Natural cooling | 550 | NG |
| 14A | 1 | 900 | 25 | 4 | 50 | 8 | 62 | Natural cooling | 750 | NG |
| 15A | 1 | 900 | 25 | 4 | 50 | 8 | 62 | Natural cooling | 650 | NG |
| 16A | 1 | 900 | 25 | 4 | 100 | 8 | 112 | Natural cooling | 750 | NG |
| 17A | 1 | 900 | 25 | 4 | 100 | 8 | 112 | Natural cooling | 650 | NG |
| 18A | 1 | 900 | 25 | 4 | 300 | 8 | 312 | Natural cooling | 750 | NG |
| 1C | 3 | 900 | 100 | 1 | 0 | 8 | 9 | Natural cooling | 750 | OK |
| 2C | 3 | 900 | 25 | 4 | 0 | 8 | 12 | Natural cooling | 750 | OK |
| 3C | 3 | 900 | 25 | 4 | 0 | 8 | 12 | Natural cooling | 650 | OK |
| 5C | 3 | 900 | 25 | 4 | 10 | 8 | 22 | Natural cooling | 750 | OK |
| 6C | 3 | 900 | 25 | 4 | 10 | 8 | 22 | Natural cooling | 650 | OK |
| 8C | 3 | 900 | 25 | 4 | 20 | 8 | 32 | Natural cooling | 750 | OK |
| 9C | 3 | 900 | 25 | 4 | 20 | 8 | 32 | Natural cooling | 650 | OK |
| 11C | 3 | 900 | 25 | 4 | 30 | 8 | 42 | Natural cooling | 750 | OK |
| 12C | 3 | 900 | 25 | 4 | 30 | 8 | 42 | Natural cooling | 650 | NG |

*Dwell time in oxidizing atmosphere and at 800° C. or higher

Figure 6A:
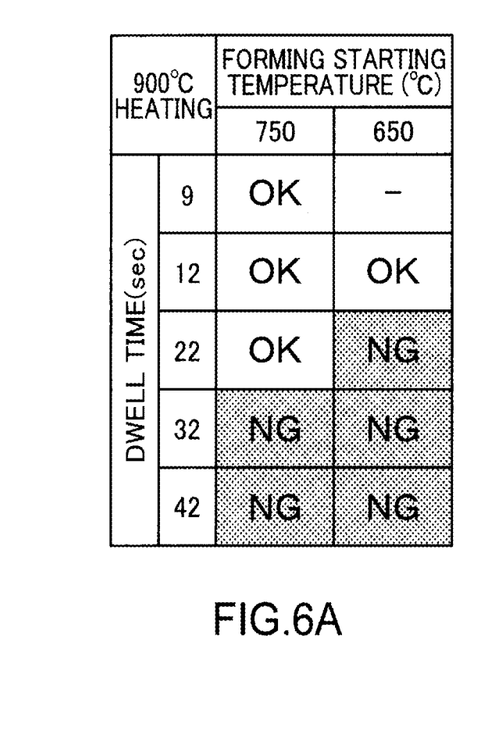
Figure 6B:
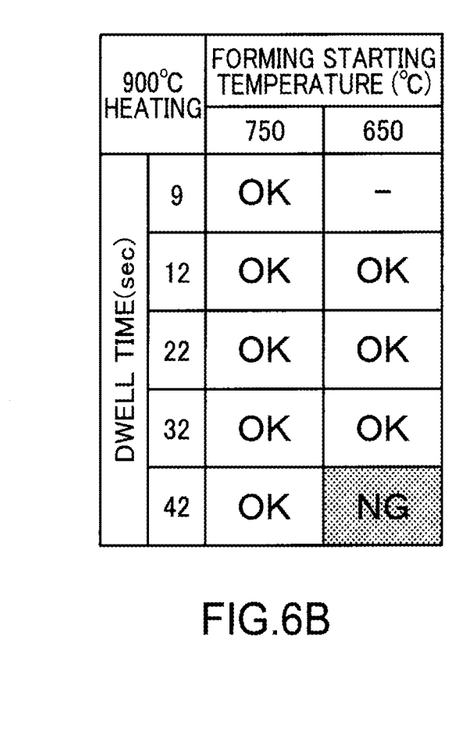
Figure 6C:
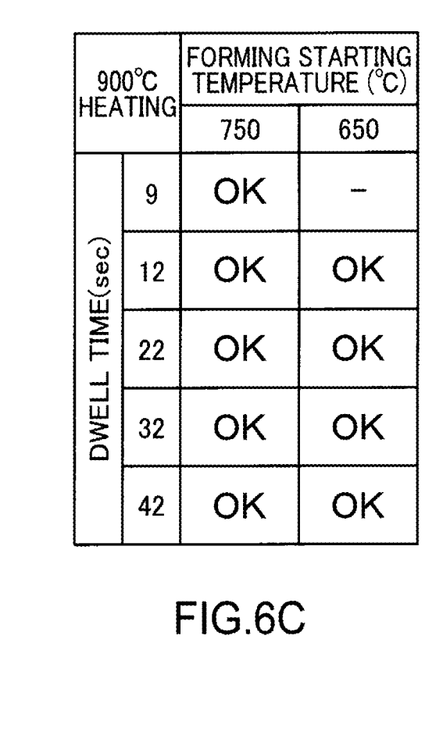

FIGS. 6A to 6C illustrate diagrams in which the relationship between the hot press forming conditions prescribed in the present invention and scale adhesion was put together using the results in Table 3-1 and Table 3-2. According to FIG. 6A, in a case where steel sheet No. 2 i.e. steel sheet having a surface-layer oxygen concentration of 0.63 mass % was used for hot press forming, scale adhesion was poor and superior scale adhesion was not achieved reliably within the range of the prescribed hot pressing conditions, depending on the combinations of those conditions, specifically heating temperature: 1100° C. or lower; dwell time in an oxidizing atmosphere and at 800° C. or higher within a time period from start of heating until completion of hot press forming: 40 seconds or less; and starting temperature of the hot press forming: 600° C. or higher. By contrast, excellent scale adhesion was obtained reliably, within the ranges of the hot press forming conditions, in a case where steel sheet No. 3 prescribed in the present invention i.e. a steel sheet having a surface-layer oxygen concentration of 0.85 mass % was used in hot press forming, as illustrated in FIG. 6B, and in a case where steel sheet No. 1 i.e. a steel sheet having a surface-layer oxygen concentration of 0.95 mass % was used in hot press forming, as illustrated in FIG. 6C. FIGS. 6A to 6C reveal that the present invention allows suppressing scale peeling during hot press forming, and obtaining reliably a steel member of good appearance, even if the prescribed dwell time is 22 seconds or longer, in particular 32 seconds.

Scale peeled off readily during hot press forming, and superior scale adhesion could not be achieved reliably, in a case where the forming starting temperature was excessively low, as illustrated in Experiment Nos. 4A, 7A, 10A and 13A in Table 3-1 and Table 3-2, and in a case where the dwell time at 800° C. or higher in hot press forming was excessively long, as illustrated in Experiment Nos. 14A to 18A in Table 3-2, even when using for hot press forming steel sheet No. 1 in which the surface-layer oxygen concentration was 0.95 mass %.

1 hot working reproduction test device
2 fixed-type presser upper die
3 presser lower die
4 test piece
5 heating electrode
6 thermocouple
7 overhang punch
8 presser spring
X internal oxide layer
Z hot press forming

The invention claimed is:

1. A method for manufacturing a hot press formed steel member, the method comprising heating and hot press forming a steel sheet,
wherein
the heating is performed at a heating temperature of 1100° C. or lower,
a dwell time in an oxidizing atmosphere and at 800° C. or higher is set to 40 seconds or less within a time period from start of heating until completion of hot press forming, and
a starting temperature of the hot press forming is set to 680° C. to 800° C.,
wherein
the steel sheet comprises in mass percent,
C: 0.15% to 0.35%;
Si: 1.0% to 3.0%;
Mn: 1.0% to 3.0%;
Al: more than 0% up to 0.10%;
Ti: ([N]×48/14)% to 0.10%, where [N] denotes the amount of N in the steel sheet;
B: 5 ppm to 50 ppm;
P: more than 0% to less than 0.015%;
S: more than 0% up to 0.010%; and
N: more than 0% up to 0.010%,
the steel sheet further comprises iron,
wherein
an average oxygen concentration from an outermost surface of the steel sheet down to a depth of 10 μm in a sheet thickness direction is 0.70 mass % or higher.

2. The method of claim 1, wherein the average oxygen concentration from the outermost surface of the steel sheet down to a depth of 10 μm in the sheet thickness direction is 0.85 mass % or higher.

3. The method of claim 1,
the steel sheet further comprises as other elements:
one or more elements selected from the group consisting of Cr, Mo, V, Nb, and W,
wherein, in mass percent, an amount of Cr is more than 0% up to 1.0%, an amount of Mo is more than 0% up to 0.5%, and a total amount of V, Nb and W is more than 0% up to 0.5%.

4. The method of claim 2,
the steel sheet further comprises as other elements:
one or more elements selected from the group consisting of Cr, Mo, V, Nb, and W,
wherein, in mass percent, an amount of Cr is more than 0% up to 1.0%, an amount of Mo is more than 0% up to 0.5%, and a total amount of V, Nb and W is more than 0% up to 0.5%.

* * * * *